(12) United States Patent
Arroyo et al.

(10) Patent No.: US 6,680,035 B2
(45) Date of Patent: *Jan. 20, 2004

(54) ATMOSPHERIC LEACH PROCESS FOR THE RECOVERY OF NICKEL AND COBALT FROM LIMONITE AND SAPROLITE ORES

(75) Inventors: J. Carlos Arroyo, Allen, TX (US); David A. Neudorf, Blackrock (AU)

(73) Assignee: BHP Minerals International Inc., Houston, TX (US)

( * ) Notice: Subject to any disclaimer, the term of this patent is extended or adjusted under 35 U.S.C. 154(b) by 201 days.

This patent is subject to a terminal disclaimer.

(21) Appl. No.: 09/864,993

(22) Filed: May 24, 2001

(65) Prior Publication Data

US 2002/0041840 A1 Apr. 11, 2002

Related U.S. Application Data

(63) Continuation-in-part of application No. 09/432,536, filed on Nov. 3, 1999, now Pat. No. 6,261,527.

(51) Int. Cl.[7] ............ C22B 23/00; C22B 3/00; C22B 61/00
(52) U.S. Cl. ............ 423/140; 423/141; 423/142; 423/143; 423/150.1; 423/150.4
(58) Field of Search ............ 423/140, 150.1, 423/143, 150.4, 141, 142

(56) References Cited

U.S. PATENT DOCUMENTS

| 3,466,144 A | 9/1969 | Kay |
| 3,793,432 A | 2/1974 | Weston |
| 3,804,613 A | 4/1974 | Zundel et al. |
| 3,991,159 A | 11/1976 | Queneau et al. |
| 4,042,474 A | 8/1977 | Saarinen |
| 4,044,096 A | 8/1977 | Queneau et al. |
| 4,062,924 A | 12/1977 | Glaum et al. |
| 4,065,542 A | 12/1977 | Subramanian et al. |
| 4,097,575 A | 6/1978 | Chou et al. |
| 4,410,498 A | 10/1983 | Hatch et al. |
| 4,511,540 A | 4/1985 | Crussard et al. |
| 4,548,794 A | 10/1985 | Lowenhaupt et al. |
| 5,571,308 A | 11/1996 | Duyvesteyn et al. |
| 6,261,527 B1 * | 7/2001 | Arroyo et al. ............ 423/140 |

FOREIGN PATENT DOCUMENTS

| SU | 1509417 | 9/1989 |
| WO | WO 96/20291 | 7/1996 |
| WO | WO 96/41025 | 12/1996 |

* cited by examiner

Primary Examiner—Steven Bos
(74) Attorney, Agent, or Firm—Brinks Hofer Gilson & Lione; G. Peter Nichols

(57) ABSTRACT

A hydrometallurgical process is provided for leaching nickeliferous laterite ores at temperatures below the boiling point of the pulp and at atmospheric pressure. The high iron fraction of the laterite, referred to as limonite, is first contacted with concentrated sulfuric acid to partially or completely dissolve the iron and nickel into solution. A reducing agent is used to keep the redox potential in solution below 1000 mV to enhance cobalt dissolution and more advantageously between 1000 and 900 mV to avoid reduction of ferric iron. Further mixing of the leach slurry in the presence of sodium, potassium, or ammonium allows formation of iron jarosite at ambient pressure. The resulting acid from iron hydrolysis is neutralized with the low iron fraction of the laterite ore (saprolite), thereby dissolving nickel into solution. The resulting final leach slurry can then be treated with conventional methods to recover nickel and cobalt from solution.

30 Claims, 2 Drawing Sheets

ATMOSPHERIC LEACH PROCESS FOR THE RECOVERY OF NICKEL AND COBALT FROM LIMONITE AND SAPROLITE ORES

This is a continuation-in-part of U.S. application Ser. No. 09/432,536, filed Nov. 3, 1999, now U.S. Pat. No. 6,261,527, the entire contents of which are incorporated herein by reference.

BACKGROUND OF THE INVENTION

The present invention relates to a hydrometallurgical process to recover nickel and cobalt from nickeliferous laterite ores and, in particular, to the atmospheric leaching of both limonite and saprolite ores with a mineral acid to dissolve nickel and cobalt wherein iron is rejected as jarosite.

The known reserves of nickel and cobalt in nickeliferous oxide ores, e.g., those referred to as laterites comprising limonite and saprolite ore, are far greater than the corresponding reserves in sulfide ores. An important disadvantage when processing laterite ores, however, is the inability to beneficiate these ores by conventional techniques.

A number of new hydrometallurgical processes are being developed for the extraction of nickel and cobalt from nickeliferous laterite ores. Many of these processes require the dissolution of the metal values with sulfuric acid at high temperature (245°–270° C.) and pressure (525–785 psig), followed by solid-liquid separation and neutralization of residual free acid present at ambient pressure. This is the basic "Moa Bay Process", as described by J. R. Boldt and P. E. Queneau in "The Winning of Nickel", Methuen, London, 1967.

During the Moa Bay Process, the nickeliferous ore is first made into a pulp having a solids content of about 40% before leaching at high temperature and pressure. During pressure leaching most metals dissolve and iron and aluminum are rejected by hydrolysis to hematite and alunite, respectively. After leaching, the pulp is cooled and washed by counter current decantation and the solids are directed to tailing treatment. Excess acid is neutralized and the remaining iron and aluminum are precipitated as hydroxides with the addition of coral mud. Nickel and cobalt are subsequently recovered by sulfide precipitation.

Several variations of the high-pressure acid leach (HPAL) method have been devised with the aim of improving the process and economical aspects. For example, U.S. Pat. No. 4,044,096 provides guidelines to optimize the high-pressure acid leaching of nickeliferous lateritic ores through a combination of operational steps to improve the economics and efficiency of leaching. The steps include scalping laterite ore to remove the coarse (high magnesium) fraction and thus lower the acid consumption.

The HPAL process is most amenable for high iron ores containing 40 wt. % iron or higher. Lateritic ores with an iron content less than 40 wt. % contain in general a higher amount of acid consuming magnesium and are therefore not economically suitable for direct high pressure leaching. U.S. Pat. No. 3,804,613 teaches a method of high-pressure acid leaching of saprolite ore at relatively low acid/ore ratios by preconditioning the saprolite with leach liquor from the high-pressure leach step. No mention is made of concurrent limonite leaching.

U.S. Pat. No. 3,991,159 teaches the use of saprolite ore to neutralize acid resulting from the high-pressure acid leach of limonite ore. Leaching of the saprolite fraction is carried out at high temperature (150°–250° C.) and pressure for effective iron and aluminum rejection, but with relatively low nickel extraction from the saprolite ore. In another process, U.S. Pat. No. 4,097,575 teaches saprolite ore roasting at 500°–750° C. under oxidizing conditions to increase its neutralization capacity before neutralization of HPAL liquors. This process suffers from the high capital cost needed for roasting facilities.

While the prior art HPAL methods obtain a high extraction of nickel and cobalt, they require the use of expensive equipment and sophisticated materials of construction to withstand the use of concentrated acid at the high temperatures needed (200°–300° C.). Furthermore, part of the rejected iron and aluminum are in the form of hydroxides, which are difficult to deal with. Several alternatives to the HPAL process to recover nickel and cobalt from laterite ore have been proposed.

For example, U.S. Pat. No. 4,062,924 describes a method for leaching limonite ores in acidic media at temperatures up to 110° C. and in the presence of hydrogen sulfide gas to precipitate dissolved nickel and cobalt. Most dissolved iron is also reduced to the divalent oxidation state, however, consuming very high amounts of the reducing gas in addition to high acid consumption.

U.S. Pat. No. 4,065,542 teaches a similar method. In this process, ferrous iron produced by the method described above is used to leach metal values from manganiferous sea nodules.

U.S. Pat. No. 4,511,540 illustrates a way to recover nickel and cobalt from ores with a manganiferous matrix by leaching with sulfuric acid in the presence of sulfur dioxide gas at temperatures below the boiling point of the liquid solution. None of these processes includes the treatment of saprolitic ores.

In the process of U.S. Pat. No. 3,793,432, limonite ore is leached with sulfuric acid at a pH below 1.5, while simultaneously adding alkaline iron-precipitating agents. The process is carried out at atmospheric pressure, but requires leaching times in excess of 40 hours and usually from 60 to 100 hours for efficient nickel extraction and iron precipitation. No use of saprolite is made in this process. U.S. Pat. No. 4,410,498 teaches a method to leach saprolite ore with sulfuric acid at atmospheric pressure, while adding a reducing agent to maintain the redox potential between 400 and 600 mV.

In another process, described in U.S. Pat. No. 5,571,308, nickel and cobalt are leached from saprolite ore by contact with a mineral acid at room temperature or in the temperature range of 60°–80° C. The leaching mode can be conducted by heap, vat, or agitation leaching.

We have now found an efficient and economical method to leach both limonite and saprolite ores in a single process at atmospheric pressure, to obtain high percent dissolution of nickel and cobalt and reject iron from the leach liquor as a jarosite compound at the same time. The method avoids the high capital costs associated with sophisticated autoclaves.

SUMMARY OF THE INVENTION

An object of the present invention is to provide a hydrometallurgical method to significantly dissolve nickel and cobalt from limonite and saprolite ores at atmospheric pressure and at temperatures below the boiling point of the leach slurry, without the need for above atmospheric pressure leaching. Another object of this invention is to provide a method to reject iron as jarosite from the leach slurry. These and other objects will more clearly appear from the following disclosure and appended drawings.

As used in the following specification and claims, all parts and percentages are by weight, unless otherwise indicated. The term limonite refers to the high iron (at least 25 wt. % Fe) and low magnesium (0.5 to 6 wt. % Mg) fraction contained within nickeliferous laterite ores. Similarly, the term saprolite denotes the low iron (5–20 wt. % Fe) and high magnesium (at least 8 wt. % Mg) fraction contained within nickeliferous laterite ores. It should be stressed that these composition ranges are in no way limiting, but represent ranges more advantageously used in this process.

DETAILED DESCRIPTION OF THE INVENTION

The present invention provides a single process to effect the dissolution of nickel and cobalt from both nickeliferous laterites, namely limonite and saprolite ores. Advantageously, the present invention economically and effectively obtains nickel and cobalt values, without the need for expensive and complicated above-atmospheric pressure leaching equipment. As a result, the processes according to the present invention do not include above atmospheric pressure leaching.

Figure 1:
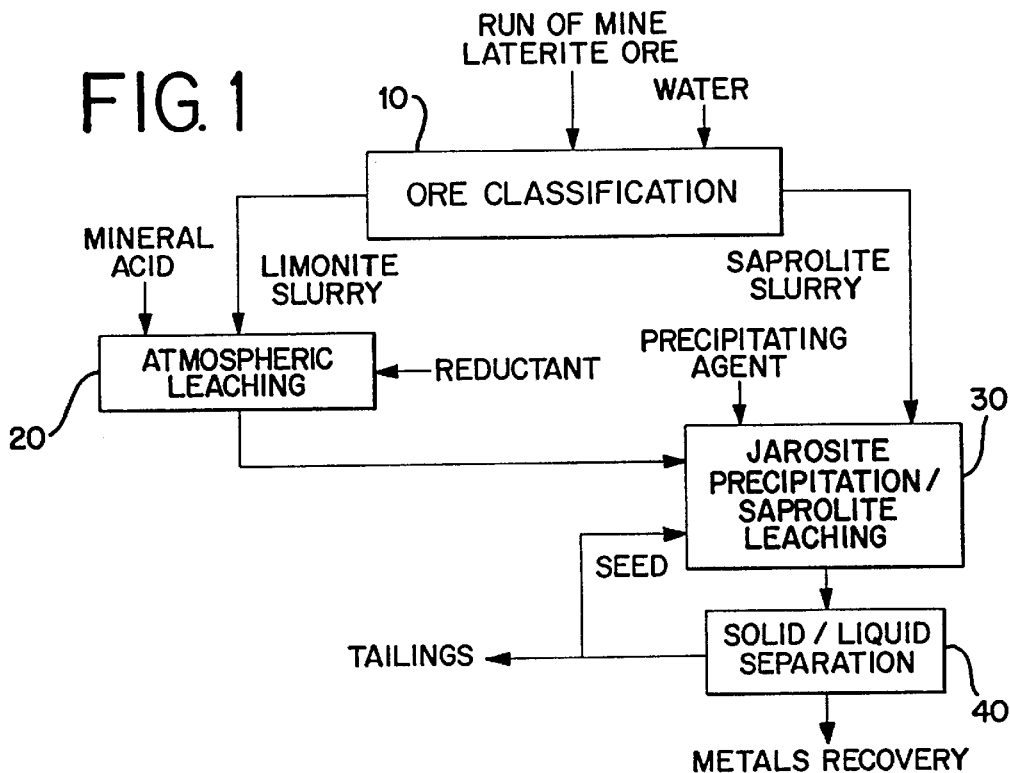
FIG. 1 shows a schematic flow sheet for the atmospheric leaching of limonite ore with a mineral acid and a reducing agent. Iron is subsequently rejected from the leach solution as insoluble jarosite by the addition of alkali metal or ammonium ions and saprolite ore is leached with acid produced by jarosite formation.

Referring now to FIG. 1, limonite and saprolite ores are first separated or classified 10. For example, the ores may be classified by pulping and screening, or mined selectively to yield two distinctive ore compositions (limonite and saprolite), as described above. The limonite ore is first pulped with water to a solids concentration between about 5 wt. % and about 35 wt. % and more advantageously to a solids content of about 25 wt. %.

The limonite ore pulp is then contacted with sulfuric acid ($H_2SO_4$) 20 to form a leach slurry at atmospheric pressure and at a temperature below the boiling point of the leach slurry. The redox potential of the leach slurry is simultaneously maintained below 1000 mV, versus standard hydrogen electrode ("SHE"), and more advantageously above 900 mV by the addition of a reducing agent to enhance cobalt dissolution.

The leach slurry is agitated (e.g., by stirring) for a period of time to significantly effect the dissolution of nickel, cobalt and iron from the ore. At the end of this first leaching period, a precipitating agent is introduced into the leach slurry at 30 to precipitate the iron. If the limonite ore was initially pulped in seawater, reduced or negligible amounts of additional precipitating agent may be required. The precipitating agent is selected from the group consisting of alkali metal (sodium or potassium), ammonium ions, or mixtures thereof. The iron is precipitated as a jarosite from the leach slurry. The amount of precipitating agent is at least stoichiometrically sufficient to precipitate substantially all of the iron. Optionally, a portion of the precipitated jarosite may be recycled by adding it with the iron precipitating agent to act as a seed.

The leach slurry is kept at a temperature above 90° C., and preferentially at the boiling point, to promote iron precipitation as jarosite. A final leach slurry is then formed at 30 by neutralizing the resultant acid with saprolite ore additions to maintain the free acid concentration in the range between about 5 gpL and about 30 gpL and to dissolve magnesium and nickel from the saprolite ore. Jarosite precipitation beneficially results in the iron concentration in the liquid or solution component of the final leach slurry being less than about 10 gpL, preferably less than about 5 gpL, most preferably less than about 0.5 gpL. Consequently, when referring to precipitating substantially all of the iron, it is meant that the final leach slurry contains less than about 10 gpL iron.

The jarosite precipitation reaction may be described as follows:

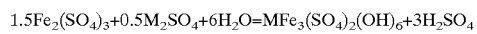

$$1.5Fe_2(SO_4)_3 + 0.5M_2SO_4 + 6H_2O = MFe_3(SO_4)_2(OH)_6 + 3H_2SO_4$$

where M is Na, Li, K, or $NH_4$.

The final leach slurry is then separated into a solid final leach residue (tailings) and a liquid component (final leach solution) at 40. Any conventional solid-liquid separation method may be used to separate the solid and liquid components, including, but not limited to, counter current decantation and filtration, or combinations thereof.

Conventional methods, including, but not limited to, sulfide precipitation with hydrogen sulfide gas, solvent extraction, electrowinning, and ion exchange, or combinations thereof may then be used to recover nickel and cobalt from the iron depleted final leach solution. Additionally, the nickel and cobalt may be directly recovered from the final leach slurry by a resin-in-pulp process.

Figure 2:
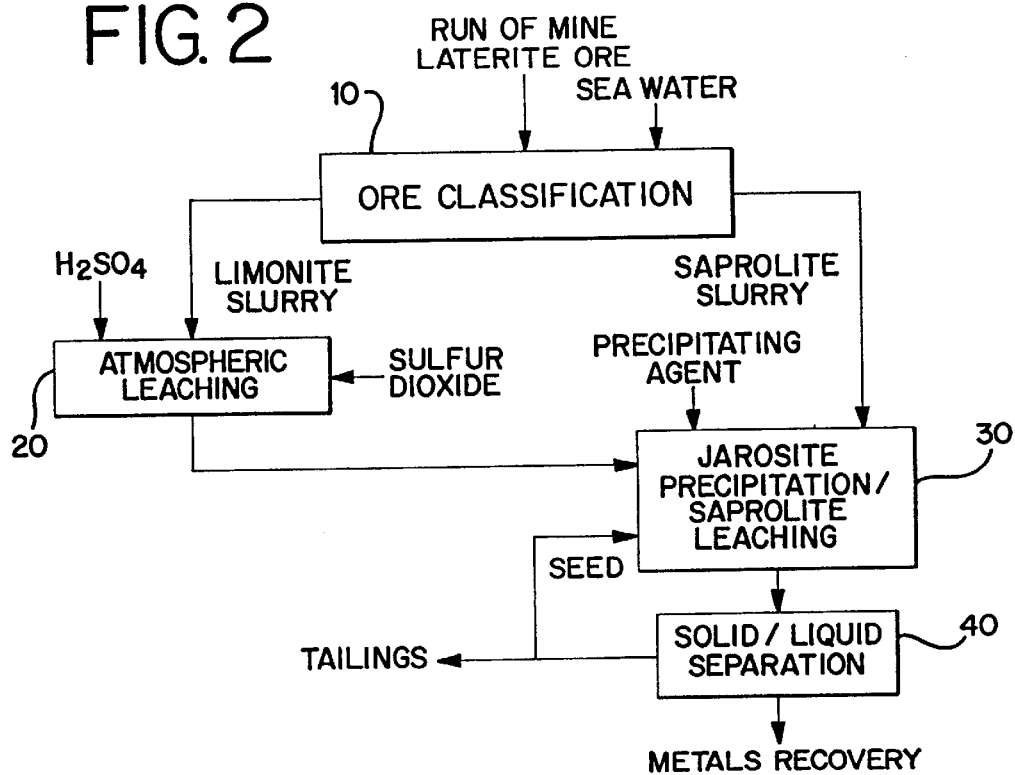
FIG. 2 is a variation of the flow sheet in FIG. 1 where seawater is used to pulp both limonite and saprolite ores prior to atmospheric leaching with sulfuric acid. Cobalt dissolution during limonite leaching is enhanced with additions of sulfur dioxide gas. Sodium present in seawater becomes the main source of iron precipitating agent.

FIG. 2 shows another embodiment of the present invention. In this embodiment, limonite is pulped in seawater at the ore separation stage or after selectively mining 10 at solids density of 20 wt. %. The limonite pulp is leached 20 at atmospheric pressure with an amount of sulfuric acid to form a leach slurry and dissolve most or all of the iron, nickel, cobalt and magnesium present in the ore. Sulfur dioxide gas, as the reducing agent, is injected into the leach slurry during the course of limonite leaching to maintain the redox potential below 1000 mV, and more advantageously above 900 mV, to enhance cobalt dissolution while minimizing reduction of ferric iron to ferrous iron. The sodium content in seawater becomes the main source of iron precipitating agent with only a small amount of additional precipitating agent required in the subsequent simultaneous precipitation of jarosite and saprolite leaching stage 30. Precipitation of jarosite is promoted by maintaining the temperature at or close to the boiling point of the leach slurry and by recycling jarosite crystals previously produced in the same way to act as a seed surface. As in FIG. 1, the final leach slurry can then be treated according to conventional methods 40 to recover the nickel and cobalt.

The following examples illustrate, but do not limit, the present invention. Unless otherwise indicated, all parts and percentages are by weight. In the first five experiments the same apparatus was used, which consisted of a glass reactor equipped with baffles, agitator motor with speed controller and marine impeller, heating mantle and thermostat, thermometer and condenser. Samples were withdrawn with a 10 cc syringe as needed and the liquid titrated after filtering to determine free acid concentration. Solid samples were usually returned to the reactor. In most cases, sulfur dioxide gas was dispensed from a cylinder via a solenoid valve and a glass frit inside the reactor. The redox potential in solution was measured with a platinum probe vs. Ag/AgCl reference electrode, but all values reported are vs. the standard hydrogen electrode. In Examples 6 to 8, a continuous pilot plant consisting of a series of mechanically agitated tanks was used.

EXAMPLE 1

This example illustrates the atmospheric leaching of limonite ore with sulfuric acid at atmospheric pressure. A sample of limonite ore, having the composition shown in Table 1, was pulped at 15 wt. % solids in deionized water and leached with sulfuric acid between 90° and 95° C., while stirring at 800 rpm. At the start of leaching, the redox potential of the solution was recorded and sulfur dioxide gas was used to control the potential at the specified value.

TABLE 1

Chemical composition of limonite ore sample (wt. %).

| Ni | Fe | Mg | Co | Al | Cr | Si | Mn | Zn |
|---|---|---|---|---|---|---|---|---|
| 1.85 | 35.23 | 4.1 | 0.096 | 3.40 | 1.52 | 6.67 | 0.73 | 0.05 |

TABLE 2

Results from the atmospheric leaching of limonite ore.

| Test ID | Leach Time (hrs) | Eh (mV) | Initial Ore wt (g) | Wt. loss (%) | Residue composition (%) | | | | | Dissolution (%) | |
|---|---|---|---|---|---|---|---|---|---|---|---|
| | | | | | Ni | Fe | Mg | Co | Mn | Ni | Co |
| 1 | 3 | 1100* | 100 | 66.2 | 0.94 | 18.40 | 3.40 | 0.176 | 1.26 | 83 | 37 |
| 2 | 3 | 900 | 292 | 68.5 | 0.43 | 13.5 | 4.48 | 0.02 | 0.04 | 92 | 93 |

*No sulfur dioxide used.

These results show that limonite ore is effectively leached with sulfuric acid at close to the boiling point of the solution at atmospheric pressure. The difference in final nickel dissolution between tests 1 and 2 corresponds to the smaller amount of acid added in test 1 (1.05 g acid/g ore) relative to test 2 (1.15 g acid/g ore). This data also illustrates the effect of sulfur dioxide to keep the redox potential below 1000 mV on the dissolution of cobalt.

In test 1, the redox potential was that measured in solution without sulfur dioxide gas addition and the final cobalt dissolution was of the order of 37%. In test 2, the redox potential was controlled at about 900 mV with sulfur dioxide additions resulting in better than 90% cobalt dissolution.

Very similar manganese dissolution numbers can be calculated from the data in this example in agreement with the notion that cobalt is mainly associated with manganese (IV) minerals (asboline). The reduction of Mn(IV) to Mn(II) is necessary to dissolve asboline efficiently.

EXAMPLE 2

This example demonstrates the leaching of limonite ore followed by simultaneous jarosite precipitation and saprolite leaching, all under atmospheric pressure conditions. Limonite ore (286 g) was first mixed with synthetic seawater containing 24.5 gpL NaCl and 4.7 gpL $MgCl_2$ to form a 20 wt. % solids pulp. The pulp was subsequently leached with sulfuric acid (acid/ore ratio of 1.2) for 3 hours at 95° C., while stirring at 800 rpm. No sulfur dioxide gas was added in this test and the measured redox potential was about 1200 mV. At the end of limonite leaching, when the free sulfuric acid concentration was of the order 10 gpL, 40 g of jarosite containing solids (used as seed) and 37 g of anhydrous sodium sulfate (make-up sodium precipitating agent) were added to the pulp. The jarosite containing solids were previously obtained in a similar test and consisted of natrojarosite crystals as well as limonite and saprolite leach residues. The free sulfuric acid concentration in solution was controlled between 5 gpL and 15 gpL with manual additions of dry saprolite ore. The average chemical composition of limonite ore, saprolite ore and jarosite seed used in this test are shown in Table 3. Saprolite additions continued until the free acid concentration in solution remained at around 5 gpL for a total of 235 g.

TABLE 3

Chemical composition of limonite, saprolite and jarosite containing residue that was used as a seed (wt. %).

| Sample | Ni | Fe | Mg | Co | Al | Cr | Si | Mn | Zn |
|---|---|---|---|---|---|---|---|---|---|
| Limonite | 1.85 | 35.70 | 4.00 | 0.091 | 3.32 | 1.53 | 6.55 | 0.748 | 0.053 |
| Saprolite | 2.01 | 8.29 | 16.30 | 0.025 | 1.03 | 0.483 | 20.5 | 0.181 | 0.01 |
| Seed | 0.47 | 23.5 | 2.25 | 0.044 | 1.47 | 1.08 | 10.7 | 0.322 | 0.02 |

TABLE 4

Results from the atmospheric leaching of limonite followed by simultaneous jarosite precipitation and saprolite leaching.

| Weight (g) | Ni | Fe | Mg | Co | | Ni | Fe | Na |
|---|---|---|---|---|---|---|---|---|
| Final residue composition (wt. %) | | | | | Pregnant solution (g/L) | | | |
| 600 | 0.33 | 19.6 | 2.5 | 0.025 | After limonite leach | 4.2 | 82.3 | 19.7 |
| Overall metal dissolution (wt. %) | | | | | | | | |
| | 80 | 0.2 | 70 | 55 | At end of test | 6.7 | 0.25 | 7.3 |

TABLE 5

Results from the atmospheric leaching of limonite followed by simultaneous jarosite precipitation and saprolite leaching.

| Weight (g) | Ni | Fe | Mg | Co | | Ni | Fe | $Fe^{+2}$ | Na |
|---|---|---|---|---|---|---|---|---|---|
| Final residue composition (wt. %) | | | | | Pregnant solution (g/l) | | | | |
| 545 | 0.32 | 20.7 | 2.7 | 0.005 | After Limonite leach | 4.1 | 82.3 | — | 11.4 |
| Overall metal dissolution (wt. %) | | | | | | | | | |
| | 83 | 1.7 | 71 | 90 | At end of test | 6.5 | 3.8 | 3.3 | 0.06 |

The results from this test, given in Table 4, show that about 82 gpL of iron was present in solution at the end of limonite leaching, confirming that the limonite ore was efficiently leached. Iron and sodium concentrations decreased to about 0.25 and 7.3 gpL, respectively at the end of the test due to natro-jarosite precipitation. Acid released by iron hydrolysis to jarosite was used to dissolve magnesium and nickel from saprolite ore. Therefore, overall nickel and cobalt dissolution from both limonite and saprolite ore at the end of the test was 80% and 55%, respectively. The amount of sodium used in the test for jarosite precipitation corresponded to approximately a molar ratio of sodium to iron of 0.6, or slightly less than twice the stoichiometric amount of sodium needed for complete precipitation of iron. X-ray diffraction performed on the final residue confirmed the presence of natro-jarosite. The total time for jarosite formation in this test was on the order of 15 hours.

The results in Table 5 show that iron produced during atmospheric leaching of limonite ore was hydrolyzed in the second part of the test, whereby the acid produced from hydrolysis was used to dissolve nickel and magnesium from saprolite ore. Overall nickel and cobalt dissolution from both limonite and saprolite ores was on the order of 83% and 90%, respectively, with the high cobalt dissolution in this test due to the addition of sulfur dioxide gas during limonite leaching. Iron and sodium concentrations decreased to about 3.8 gpL and 0.06 gpL, respectively, at the end of the test due to natro-jarosite precipitation. Iron obtained after atmospheric leaching of limonite ore was precipitated in this test with about the stoichiometric amount of sodium needed for complete iron precipitation. The only source of sodium in the test was sodium chloride salt, and the total time for jarosite precipitation was about 18 hours. Although a relatively high total iron concentration remained in solution at the end of the test, most of this iron existed in the divalent state, which can not precipitate as jarosite.

EXAMPLE 3

Limonite ore (284 g) was mixed with synthetic seawater containing 24.5 gpL NaCl and 4.7 gpL $MgCl_2$ to form a 20 wt % solids pulp. The pulp was subsequently leached with sulfuric acid (acid/ore ratio of 1.2) for 3 hours at 95° C., while stirring at 800 rpm. The redox potential in solution was controlled between 900 mV and 830 mV with additions of sulfur dioxide gas. At the end of limonite leaching, when the free sulfuric acid concentration was on the order 10 gpL, 40 g of jarosite containing solids (used as seed) and 5 g of sodium chloride (make-up sodium precipitating agent) were added to the pulp. The jarosite containing solids were previously obtained in a similar test and consisted of natro-jarosite crystals as well as limonite and saprolite leach residues. The free sulfuric acid concentration in solution was controlled between 5 gpL and 15 gpL with manual additions of dry saprolite ore. The average chemical composition of limonite ore, saprolite ore and jarosite seed used in this test are shown in Table 3. Saprolite additions continued until the free acid concentration in solution remained at around 5 gpL for a total of 236 g.

EXAMPLE 4

Limonite ore (281 g) was mixed with deionized water to form a 20 wt. % solids pulp. The pulp was subsequently leached with sulfuric acid (acid/ore ratio of 1.2) for 3 hours at 95° C., while stirring at 800 rpm to form a leach slurry. The redox potential in solution was controlled at 900 mV with additions of sulfur dioxide gas. At the end of limonite leaching, when the free sulfuric acid concentration was about 10 gpL, 40 g of jarosite containing solids (used as seed) and 44 g of sodium sulfate precipitating agent were added to the slurry. The jarosite containing solids were previously obtained in a similar test and consisted of natro-jarosite crystals as well as limonite and saprolite leach residues. The free sulfuric acid concentration in solution was controlled between 5 gpL and 15 gpL with manual additions of dry saprolite ore. The average chemical composition of limonite ore, saprolite ore, and jarosite seed used in this test are shown in Table 3. Saprolite additions continued until the free acid concentration in solution remained at around 5 gpL for a total of 236 g.

TABLE 6

Results from the atmospheric leaching of limonite followed by simultaneous jarosite precipitation and saprolite leaching.

| Weight (g) | Ni | Fe | Mg | Co | | Ni | Fe | Fe$^{+2}$ | Na |
|---|---|---|---|---|---|---|---|---|---|
| Final residue composition (wt. %) | | | | | | Pregnant solution (g/l) | | | |
| 601 | 0.29 | 20.2 | 2.4 | 0.007 | After Limonite leach | 4.0 | 79 | — | 12.1 |
| | Overall metal dissolution (wt. %) | | | | | | | | |
| | 82 | 1.2 | 70 | 89 | At end of test | 6.5 | 1.43 | 1.22 | 3.2 |

Results from this test show that the process is equally effective in fresh deionized water and that jarosite precipitation can be carried out with sodium sulfate as the only source of sodium. Iron and sodium concentrations decreased to about 1.43 and 3.2 gpL, respectively at the end of the test due to natro-jarosite precipitation. Iron obtained after atmospheric leaching of limonite ore was precipitated in this test with only slightly more than the stoichiometric amount of sodium needed for complete iron precipitation. Total time for jarosite precipitation was about 17 hours. Final nickel and cobalt dissolution from both limonite and saprolite ore was 82% and 89%, respectively. The reason for the high cobalt dissolution was the addition of sulfur dioxide gas during limonite leaching. Most remaining iron in solution at the end of the test was in the divalent oxidation state.

EXAMPLE 5

Limonite ore batches (280 g) were leached with sufficient sulfuric acid at 90° C. and 800 rpm to dissolve all the iron, magnesium and nickel contained within the ore. The composition of the feed ore is given in Table 1. The pulp was leached for 3 hours and the redox potential in solution was monitored and adjusted to different values with addition of sulfur dioxide gas. At the end of the leaching time, the solid residues were chemically analyzed to determine their respective composition.

Figure 3:
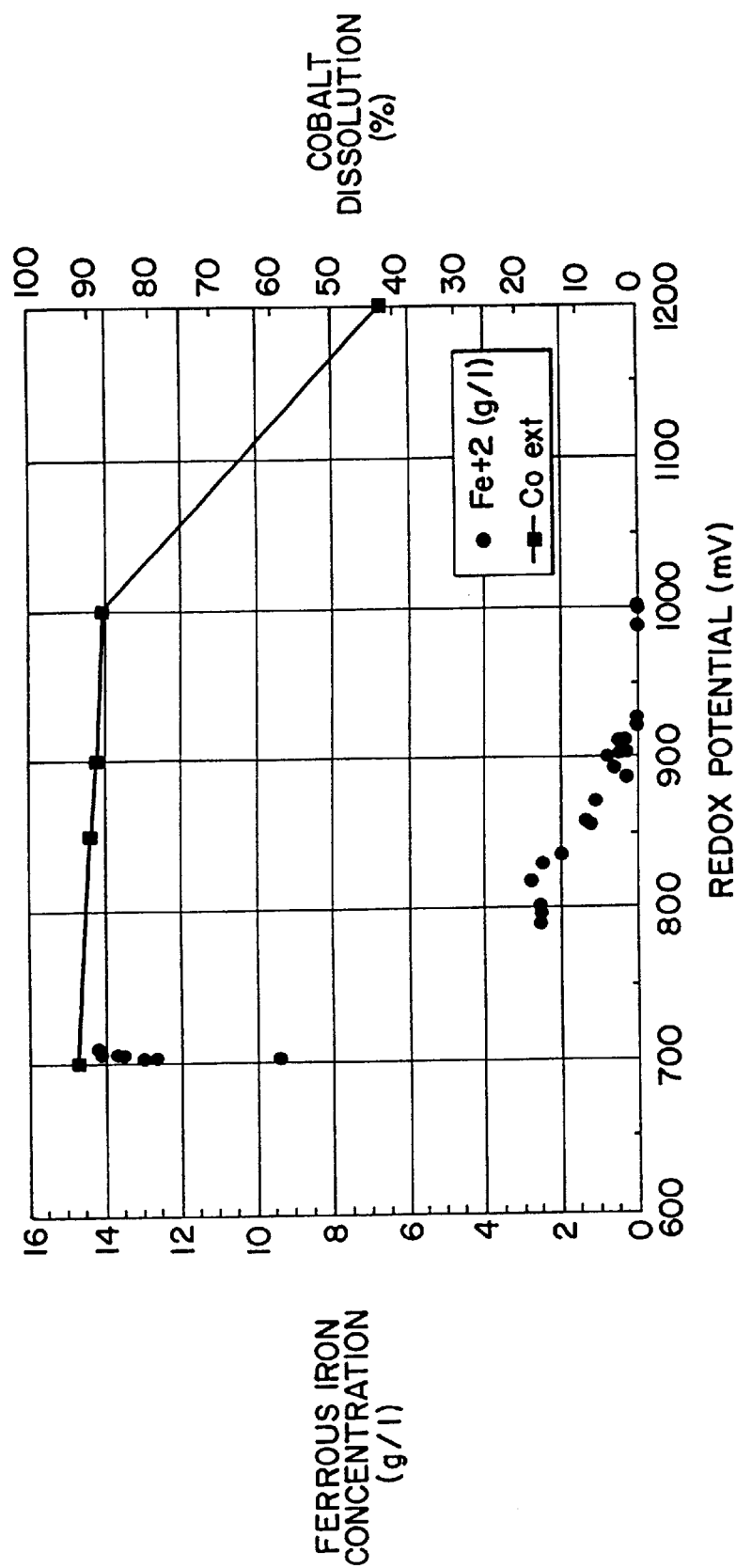
FIG. 3 illustrates the effect of oxidation potential on cobalt dissolution and iron reduction from the trivalent to the divalent oxidation state during limonite atmospheric leaching.

The percent cobalt extraction as calculated from the chemical composition of solids residues was plotted as a function of the average redox potential in the tests. The extent of cobalt dissolution from limonite ore increased sharply when the redox potential decreased below 1000 mV, as shown in FIG. 3. The percent cobalt extraction (Co ext) did not significantly increase further below 1000 mV. Liquid samples were withdrawn during the experiments when variations in redox potential occurred and the concentration of ferrous iron in these samples is also shown as a function of redox potential in FIG. 3. As can be seen from the graph, the iron dissolved in solution was initially reduced by sulfur dioxide gas below about 900 mV. Therefore, it is preferred to maintain the redox potential during limonite leaching between about 900 mV and about 1000 mV to maximize cobalt dissolution without reducing iron to the divalent oxidation state, which unnecessarily consumes sulfur dioxide gas and prevents precipitation of iron as jarosite in the subsequent step.

EXAMPLE 6

Limonite and saprolite ores of the compositions given in Table 7 below were leached continuously in a mini-pilot plant consisting of fourteen agitated mix tanks in series. The first two tanks had about 18 Liters working volume each, whereas the last twelve tanks had about 55 Liters working volume each. Each tank was constructed of rubber-lined carbon steel and was equipped with four wall baffles and a mechanical agitator to suspend the solids in the leach pulp. Limonite ore was pulped in the first tank in each train at about 20% solids in an aqueous solution containing about 10.5 g/L sodium as sodium chloride, to roughly simulate the salt content of seawater. Concentrated sulfuric acid (98% by weight) was added as well to the first leach tank. Each tank was heated with an electrical heater to maintain the leach pulp temperature in the range of about 95° to 105° C.

Saprolite ore was ground to −48 mesh and pulped at about 20% solids in the same synthetic seawater solution. This saprolite ore pulp was distributed equally to the fifth through eleventh tanks in the leach train. The leach train was operated for 84 hours continuously without interruption. Average flow rates of limonite and saprolite ores and sulfuric acid during this period are given in Table 8 below. The average composition of leach residue, based on samples of the final leach slurry taken at six hour intervals, is given in Table 7. Based on this data, the average acid/ore ratio during the test was 0.64 tonnes per tonne of total ore (100% $H_2SO_4$ basis) and the average saprolite/limonite ratio was 0.89 tonnes per tonne.

TABLE 7

Average Ore and Final Residue and Solution Compositions

| | % Al | % Co | % Cr | % Fe | % Mg | % Mn | % Ni | % Si |
|---|---|---|---|---|---|---|---|---|
| Limonite | 2.5 | 0.12 | 1.9 | 39. | 3.2 | 0.77 | 1.66 | 6.3 |
| Saprolite | 1.2 | 0.06 | 0.76 | 10. | 15.2 | 0.35 | 1.29 | 19. |
| Leach Residue | 0.59 | 0.03 | 0.90 | 25. | 2.1 | 0.15 | 0.24 | 11. |

TABLE 8

Average Flow rates of Ore and Sulfuric Acid

Limonite Ore Flow rate = 147 g/min (average dry basis)
Saprolite Ore Flow rate = 131 g/min (average dry basis)
Sulfuric Acid Flow rate = 179 g/min (average 98% $H_2SO_4$)

The average iron and free acid concentrations of the leach solution in the fourth reactor (prior to the addition of saprolite ore) were 74 g/L and 26 g/L, respectively. The average free acid concentrations in the sixth, eighth, tenth, twelfth, and fourteenth reactors were 19 g/L, 24 g/L, 21 g/L, 19 g/L, and 19 g/L, respectively. The average nickel, cobalt, and iron concentrations in the fourteenth leach reactor (final leach solution) were about 4.9 g/L, 0.21 g/L, and 4.4 g/L, respectively.

The color of the solids in reactors five through fourteen was the brownish yellow color typical of sodium jarosite. X-ray diffraction analysis of the residue in the final leach slurry confirmed that sodium jarosite was the predominant crystalline compound present in the residue. Nickel and cobalt extractions, based on solid residue and ore assays, averaged 83% and 68%, respectively, during the test period. No reductant was added to the leach slurry during the test to enhance cobalt extraction.

EXAMPLE 7

Another continuous leach of 85 hours duration was carried out in the same equipment configuration and at similar conditions as in Example 6. Average compositions of ore and residue and average flow rates of ore and sulfuric acid are given in Tables 9 and 10.

Average compositions of ore and residue and average flow rates of ore, sulfuric acid and sulfur dioxide are given in Tables 11 and 12.

TABLE 11

Average Ore and Final Residue and Solution Compositions

|  | % Al | % Co | % Cr | % Fe | % Mg | % Mn | % Ni | % Si |
|---|---|---|---|---|---|---|---|---|
| Limonite | 3.5 | 0.10 | 1.6 | 35. | 4.7 | 0.74 | 1.95 | 7.1 |
| Saprolite | 1.6 | 0.11 | 0.90 | 13.6 | 14.0 | 0.63 | 1.84 | 17.2 |
| Leach Residue | 1.1 | <0.01* | 1.0 | 22.9 | 2.4 | 0.04 | 0.18 | 11.5 |

*Cobalt assay detection limit 0.01%

TABLE 9

Average Ore and Final Residue and Solution Compositions

|  | % Al | % Co | % Cr | % Fe | % Mg | % Mn | % Ni | % Si |
|---|---|---|---|---|---|---|---|---|
| Limonite | 2.3 | 0.12 | 1.6 | 37. | 3.5 | 0.74 | 1.71 | 7.5 |
| Saprolite | 0.80 | 0.03 | 0.64 | 9.4 | 15.5 | 0.18 | 3.02 | 18.6 |
| Leach Residue | 0.56 | 0.03 | 0.73 | 23.7 | 1.6 | 0.18 | 0.36 | 12.3 |

TABLE 10

Average Flow rates of Ore and Sulfuric Acid

Limonite Ore Flow rate = 146 g/min (average dry basis)
Saprolite Ore Flow rate = 155 g/min (average dry basis)
Sulfuric Acid Flow rate = 186 g/min (average 98% $H_2SO_4$)

Based on the above data, the average acid/ore ratio during the test was 0.6 tonnes per tonne of total ore (100% $H_2SO_4$ basis) and the average saprolite/limonite ratio was 1.06 tonnes per tonne.

The average iron and free acid concentrations of the leach solution in the fourth reactor (prior to the addition of saprolite ore) were 75 g/L and 34 g/L, respectively. The average free acid concentrations in the sixth, eighth, tenth, twelfth, and fourteenth reactors were 16 g/L, 19 g/L, 15 g/L, 11 g/L, and 8 g/L, respectively. The average nickel, cobalt, and iron concentrations in the fourteenth leach reactor (final leach solution) were about 7.7 g/L, 0.16 g/L, and 1.8 g/L, respectively.

The color of the solids in reactors five through fourteen was the brownish yellow color typical of sodium jarosite. X-ray diffraction analysis of the final residue confirmed that sodium jarosite was the predominant crystalline compound present in the residue. Nickel and cobalt extractions, based on solid residue and ore assays, averaged 84% and 53%, respectively, during the test period. No reductant was added to the leach slurry during the test to enhance cobalt extraction.

EXAMPLE 8

Another continuous leach of 65 hours duration was carried out in the same equipment configuration and at similar conditions as in Example 6, with the following exceptions. All of the saprolite ore pulp was added to the fifth leach reactor. Sulfur dioxide was metered into the second reactor at a constant rate during the test to ensure reduction of tetravalent manganese compounds to the divalent state.

TABLE 12

Average Flow rates of Ore, Sulfuric Acid, and Sulfur Dioxide

Limonite Ore Flow rate = 162 g/min (average dry basis)
Saprolite Ore Flow rate = 131 g/min (average dry basis)
Sulfuric Acid Flow rate = 210 g/min (average 98% $H_2SO_4$)
Sulfur Dioxide Flow rate = 0.73 g/min Based on the above data, the average acid/ore ratio during the test was 0.7 tonnes per tonne of total ore (100% $H_2SO_4$ basis), the average saprolite/limonite ratio was 0.8 tonnes per tonne, and the average sulfur dioxide/ore ratio was 2.5 kg per tonne ore.

The average iron and free acid concentrations of the leach solution in the fourth reactor (prior to the addition of saprolite ore) were 82 g/L and 30 g/L, respectively. The average free acid concentrations in the fifth, seventh, ninth, twelfth, and fourteenth reactors were 11 g/L, 24 g/L, 27 g/L, 26 g/L, and 27 g/L, respectively. The average nickel, cobalt, and iron concentrations in the fourteenth leach reactor (final leach solution) were about 5.3 g/L, 0.30 g/L, and 7.3 g/L, respectively. The color of the solids in reactors five through fourteen was the brownish yellow color typical of sodium jarosite. Nickel and cobalt extractions, based on solid residue and ore assays, averaged about 91% and greater than about 91%, respectively, during the test period.

Although what are presently believed as the invention's preferred embodiments are described, those skilled in the art will realize that changes and modifications may be made thereto without departing from the spirit of the invention. We claim all changes and modifications that fall within the scope of the invention.

What is claimed:

1. A hydrometallurgical process to extract nickel and cobalt from a laterite ore that includes at least a limonite and a saprolite ore, the process comprises:

a. producing a limonite ore pulp in water, wherein the pulp has a solids concentration between 5 and 35 wt. % and wherein the limonite ore contains less than about 6 wt. % magnesium;

b. leaching the pulp at a temperature below the boiling point and at atmospheric pressure by mixing with sulfuric acid to form a leach slurry, wherein iron, cobalt, and nickel are dissolved in solution and substantially all the sulfuric acid is consumed;

c. adding an iron precipitating agent selected from the group consisting of sodium ions, potassium ions, ammonium ions, and mixtures thereof to the pulp or leach slurry; and d. maintaining the leach slurry temperature between about 85° C. and the boiling point of the leach slurry and maintaining the leach slurry free acid concentration between about 5 and about 30 gpL through the addition of saprolite ore to neutralize at least a portion of the acid generated by jarosite precipitation, wherein magnesium, cobalt, and nickel are simultaneously dissolved from the saprolite ore to form a final leach slurry and the final concentration of iron in a liquid component of the final leach slurry is less than about 10 gpL due to the precipitation of iron as a jarosite compound.

2. The process of claim 1, wherein the solid density of the limonite ore pulp is about 25 wt. % solids.

3. The process of claim 1, wherein the pH of the leach slurry of step (d) is maintained between about 1.0 and about 1.8 with the addition of saprolite ore.

4. The process of claim 1, wherein the final concentration of iron in the liquid component of the final leach slurry is less than about 5 gpL.

5. The process of claim 1, wherein the final concentration of iron in the liquid component of the final leach slurry is less than about 0.5 gpL.

6. The process of claim 1, wherein the water is seawater that provides a source of iron precipitating agent.

7. The process of claim 1, wherein the redox potential of the leach slurry during step (d) is maintained below 1000 mV versus standard hydrogen electrode (SHE).

8. The process of claim 7, wherein the redox potential is controlled by adding a reducing agent that enhances cobalt dissolution.

9. The process of claim 8, wherein sulfur dioxide gas is the reducing agent.

10. The process of claim 1, wherein at least a portion of the jarosite compound is added to the leach slurry prior to addition of the saprolite to serve as a seeding surface to enhance precipitation of iron as jarosite.

11. The process of claim 1, further comprising subjecting the final leach slurry to a solid-liquid separation to form a final leach solution and a final leach residue.

12. The process of claim 11, wherein the solid-liquid separation is conducted by a process selected from the group consisting of counter current decantation, filtration, and a combination thereof.

13. The process of claim 12, further comprising separating nickel and cobalt from the final leach solution.

14. The process of claim 13, wherein the separation is conducted by a process selected from the group consisting of sulfide precipitation with hydrogen sulfide gas, solvent extraction, electro winning, ion exchange, and a combination thereof.

15. The process of claim 1, wherein nickel and cobalt are recovered from the final leach slurry by a resin-in-pulp process.

16. A hydrometallurgical process to extract nickel and cobalt from a laterite ore that includes at least a limonite and a saprolite ore, the process comprises the following sequential steps:

a. producing a limonite ore pulp in water, wherein the pulp has a solids concentration between 5 and 35 wt. % and wherein the limonite ore contains less than about 6 wt. % magnesium;

b. leaching the pulp at a temperature below the boiling point and at atmospheric pressure by mixing with sulfuric acid to form a leach slurry, wherein iron, cobalt, and nickel are dissolved in solution and substantially all the sulfuric acid is consumed;

c. adding an iron precipitating agent selected from the group consisting of sodium ions, potassium ions, ammonium ions, and mixtures thereof to the pulp or leach slurry; and d. maintaining the leach slurry temperature between about 85.degree. C. and the boiling point of the leach slurry and maintaining the leach slurry free acid concentration between about 5 and about 30 gpL through the addition of saprolite ore to neutralize at least a portion of the acid generated by jarosite precipitation, wherein magnesium, cobalt, and nickel are simultaneously dissolved from the saprolite ore to form a final leach slurry and the final concentration of iron in a liquid component of the final leach slurry is less than about 10 gpL due to the precipitation of iron as a jarosite compound, wherein the process is free of above atmospheric pressure leaching.

17. The process of claim 16, wherein the solid density of the limonite ore pulp is about 25 wt. % solids.

18. The process of claim 16, wherein the pH of the leach slurry of step (d) is maintained between about 1.0 and about 1.8 with the addition of saprolite ore.

19. The process of claim 16, wherein the final concentration of iron in the liquid component of the final leach slurry is less than about 5 gpL.

20. The process of claim 16, wherein the final concentration of iron in the liquid component of the final leach slurry is less than about 0.5 gpL.

21. The process of claim 16, wherein the water is seawater that provides a source of iron precipitating agent.

22. The process of claim 16, wherein the redox potential of the leach slurry during step (d) is maintained below 1000 mV versus standard hydrogen electrode (SHE).

23. The process of claim 22, wherein the redox potential is controlled by adding a reducing agent that enhances cobalt dissolution.

24. The process of claim 23, wherein sulfur dioxide gas is the reducing agent.

25. The process of claim 16, wherein at least a portion of the jarosite compound is added to the leach slurry prior to addition of the saprolite to serve as a seeding surface to enhance precipitation of iron as jarosite.

26. The process of claim 16, further comprising subjecting the final leach slurry to a solid-liquid separation to form a final leach solution and a final leach residue.

27. The process of claim 26, wherein the solid-liquid separation is conducted by a process selected from the group consisting of counter current decantation, filtration, and a combination thereof.

28. The process of claim 27, further comprising separating nickel and cobalt from the final leach solution.

29. The process of claim 28, wherein the separation is conducted by a process selected from the group consisting of sulfide precipitation with hydrogen sulfide gas, solvent extraction, electrowinning, ion exchange, and a combination thereof.

30. The process of claim 16, wherein nickel and cobalt are recovered from the final leach slurry by a resin-in-pulp process.

* * * * *